United States Patent
Huang

(10) Patent No.: US 12,291,006 B2
(45) Date of Patent: May 6, 2025

(54) POLYMER FILM AND USES OF THE SAME

(71) Applicant: Chang Chun Petrochemical Co., Ltd., Taipei (TW)

(72) Inventor: Tzu-Jung Huang, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 18/411,858

(22) Filed: Jan. 12, 2024

(65) Prior Publication Data

US 2025/0091328 A1 Mar. 20, 2025

(30) Foreign Application Priority Data

Sep. 19, 2023 (CN) .......................... 202311207195.2
Sep. 19, 2023 (TW) ................................ 112135738

(51) Int. Cl.
  *B32B 17/10* (2006.01)
(52) U.S. Cl.
  CPC .. *B32B 17/10761* (2013.01); *B32B 17/10036* (2013.01); *B32B 17/10605* (2013.01); *B32B 17/10899* (2013.01); *B32B 2250/03* (2013.01); *B32B 2250/40* (2013.01); *B32B 2331/04* (2013.01)
(58) Field of Classification Search
  CPC ........ B32B 17/10761; B32B 17/10036; B32B 17/10605; B32B 17/10899; B32B 2250/03; B32B 2250/40; B32B 2331/04
  See application file for complete search history.

(56) References Cited

U.S. PATENT DOCUMENTS

| | | |
|---|---|---|
| 2010/0316843 A1 | 12/2010 | Chu et al. |
| 2012/0244329 A1 | 9/2012 | Iwamoto et al. |
| 2015/0175757 A1 | 6/2015 | Aten et al. |
| 2019/0047262 A1 | 2/2019 | Minakuchi et al. |
| 2019/0152208 A1* | 5/2019 | Steuer .................. B32B 27/306 |
| 2023/0182447 A1 | 6/2023 | Huang et al. |
| 2023/0182448 A1 | 6/2023 | Huang |

FOREIGN PATENT DOCUMENTS

| | | |
|---|---|---|
| CN | 105916920 A | 8/2016 |
| JP | 2004-083360 A | 3/2004 |
| JP | 2007-331959 A | 12/2007 |
| JP | 2019-161206 A | 9/2019 |
| JP | 2023-086680 A | 6/2023 |
| JP | 2023-086683 A | 6/2023 |
| KR | 10-2017-0095866 A | 8/2017 |
| KR | 10-2005190 B1 | 7/2019 |
| TW | 201605955 A | 2/2016 |
| WO | WO 2011/081190 A1 | 7/2011 |
| WO | WO 2016/094213 A1 | 6/2016 |
| WO | WO 2017/135448 A1 | 8/2017 |

* cited by examiner

*Primary Examiner* — Christopher W Raimund
(74) *Attorney, Agent, or Firm* — Christensen, Fonder, Dardi & Herbert PLLC

(57) ABSTRACT

A polymer film including a first portion and a second portion laminated with the first portion. Each portion independently consists of one or more layers. The first and second layers each independently have a melt index ranging from 3.5 g/10 min to 10.0 g/10 min, and lower than 3.5 g/10 min, respectively. Each layer of the first portion independently has a product of its melt index and a thickness ratio of its thickness to the total thickness of the first and second portions, such that the sum of the product of each layer of the first portion ranges from 0.39 g/10 min to 2.50 g/10 min. Each layer of the second portion independently has a product of its melt index and a thickness ratio of its thickness to the total thickness of the first and second portions, such that the sum of the product of each layer of the second portion ranges from 1.10 g/10 min to 2.95 g/10 min.

17 Claims, No Drawings

POLYMER FILM AND USES OF THE SAME

CLAIM FOR PRIORITY

This application claims the benefit of Taiwan Patent Application No. 112135738 filed on Sep. 19, 2023 and the benefit of China Patent Application No. 202311207195.2 filed on Sep. 19, 2023, the subject matters of which are incorporated herein in their entirety by reference.

BACKGROUND OF THE INVENTION

Field of the Invention

The present invention relates to a polymer film, specifically a multi-layer polymer film with a feature of a product of melt index (MI) and thickness ratio. The present invention also relates to a laminated glass manufactured by using the polymer film.

Descriptions of the Related Art

Laminated glass is a glass material with a composite structure formed by interposing a polymer film between two glass sheets and performing hot-pressing to bond the glass sheets and the polymer film together. Since laminated glass has superior impact resistance and safety property, it is widely used in the automobile and building industries.

A polymer film with a multi-layer structure can be used as an intermediate film of laminated glass to improve acoustic insulation function of the laminated glass. The aforementioned polymer film has two outer layers and one inner layer disposed between the two outer layers, wherein the acoustic insulation function is achieved by means of increasing the thickness of the inner layer and adjusting the viscoelastic property of the inner layer to increase the attenuation of sound vibration. However, none of the conventional laminated glasses can simultaneously have good safety property, optical properties and acoustic insulation performance.

SUMMARY OF THE INVENTION

In view of the above, the present invention is directed to a polymer film, which comprises a first portion and a second portion. The research shows that, by means of controlling the melt index of each layer of the first portion and the second portion as well as the product of the melt index and thickness ratio of each layer of the first portion and the second portion, the polymer film can be provided with good structural uniformity, and the laminated glass provided by using the poly film has excellent acoustic insulation effect, excellent optical properties and excellent safety property (high mechanical strength). Thus, the polymer film of the present invention is particularly suitable for manufacturing a sound insulating laminated glass.

Thus, an objective of the present invention is to provide a polymer film, which comprises a first portion and a second portion laminated with the first portion, the first portion and the second portion independently consist of one or more layers, wherein:
  each layer of the first portion independently has a melt index ranging from 3.5 g/10 min to 10.0 g/10 min, and each layer of the second portion independently has a melt index lower than 3.5 g/10 min;
  each layer of the first portion independently has a thickness ratio of its thickness to the total thickness of the first portion and the second portion and a product of its melt index and the thickness ratio, with the proviso that the sum of the product of each layer of the first portion ranges from 0.39 g/10 min to 2.50 g/10 min; and
  each layer of the second portion independently has a thickness ratio of its thickness to the total thickness of the first portion and the second portion and a product of its melt index and the thickness ratio, with the proviso that the sum of the product of each layer of the second portion ranges from 1.10 g/10 min to 2.95 g/10 min.

In some embodiments of the present invention, the melt index of each layer of the second portion is independently from 1.5 g/10 min to 3.3 g/10 min.

In some embodiments of the present invention, the melt index of each layer of the first portion and the melt index of each layer of the second portion are measured in accordance with ASTM D1238 under 190° C. and a loading of 2.16 kg.

In some embodiments of the present invention, each layer of the first portion and each layer of the second portion independently comprise polyvinyl acetal, and the polyvinyl acetal can be selected from the group consisting of poly(vinyl formal), poly(vinyl acetal), poly(vinyl butyral), poly(vinyl pentanal), poly(vinyl hexanal), and combinations thereof. In the preferred embodiments of the present invention, each layer of the first portion and each layer of the second portion independently comprise poly(vinyl butyral).

In some embodiments of the present invention, each layer of the first portion independently comprises polyvinyl acetal with the following properties: a degree of acetalization ranging from 56 mol % to 74 mol %, a degree of acetylation ranging from 5 mol % to 15 mol %, and a content of hydroxyl ranging from 20 mol % to 30 mol %, based on the total number of moles of hydroxyl, acetal group, and acetyl group of polyvinyl acetal comprised in each layer of the first portion.

In some embodiments of the present invention, each layer of the second portion independently comprises polyvinyl acetal with the following properties: a degree of acetalization ranging from 60 mol % to 75 mol %, a degree of acetylation ranging from 0.1 mol % to 5 mol %, and a content of hydroxyl ranging from 20 mol % to 35 mol %, based on the total number of moles of hydroxyl, acetal group, and acetyl group of polyvinyl acetal comprised in each layer of the second portion.

In some embodiments of the present invention, the polyvinyl acetal comprised in each layer of the first portion independently has a number average molecular weight (Mn) ranging from 100,000 to 240,000.

In some embodiments of the present invention, the polyvinyl acetal comprised in each layer of the second portion independently has a number average molecular weight (Mn) ranging from 90,000 to 120,000.

In some embodiments of the present invention, each layer of the first portion and each layer of the second portion independently further comprise a plasticizer.

In some embodiments of the present invention, each layer of the first portion and each layer of the second portion independently further comprise a plasticizer. Each layer of the first portion independently comprises a plasticizer in an amount ranging from 55 parts by weight to 85 parts by weight based on 100 parts by weight of the polyvinyl acetal comprised therein, and each layer of the second portion independently comprises a plasticizer in an amount ranging from 30 parts by weight to 50 parts by weight based on 100 parts by weight of the polyvinyl acetal comprised therein.

In some embodiments of the present invention, the one or more layers of the first portion constitute first sub-portion(s), the one or more layers of the second portion constitute second sub-portion(s), and the first sub-portion(s) and the second sub-portion(s) are arranged alternatively, wherein the number of the first sub-portion(s) is M and the number of the second sub-portion(s) is N, M and N are independently positive integers.

In some embodiments of the present invention, N is M+1.

Another objective of the present invention is to provide a laminated glass, which comprises a first glass sheet, an intermediate film, and a second glass sheet in sequence, wherein the intermediate film is provided by the aforementioned polymer film.

To render the above objectives, technical features and advantages of the present invention more apparent, the present invention will be described in detail with reference to some embodiments hereinafter.

BRIEF DESCRIPTION OF THE DRAWINGS

Not applicable.

DESCRIPTION OF THE PREFERRED EMBODIMENTS

Hereinafter, some embodiments of the present invention will be described in detail. However, the present invention may be embodied in various embodiments and should not be limited to the embodiments described in the specification.

Unless otherwise specified, the expressions "a," "the," or the like recited in the specification and the claims should include both singular and plural forms.

Unless otherwise specified, the expressions "first," "second," or the like recited in the specification and the claims are merely used to distinguish the illustrated elements or constituents without special meanings. Those expressions are not used to indicate any priority.

In the specification and the claims, the "melt index (MI)" is measured in accordance with ASTM D1238 under 190° C. and a loading of 2.16 kg.

In the specification and the claims, the unit for a number average molecular weight (Mn) is "Dalton".

In the specification and the claims, the "thickness ratio" refers to a ratio of the thickness of a single layer to the total thickness of the polymer film. For example, if the polymer film has a thickness of 2 mm and a five-layer structure, wherein the first portion of the polymer film includes three 0.5 mm thick layers and the second portion includes two 0.25 mm thick layers, then the thickness ratio of each layer of the first portion is 0.25 and the thickness ratio of each layer of the second portion is 0.125.

In the specification and the claims, the sum of the product of thickness ratio and melt index refers to the sum of the product of thickness ratio and melt index of each layer. For example, if the first portion of the polymer film has three layers, and the three layers respectively have a thickness ratio of 0.1, 0.2, and 0.3, and a melt index of 3.5 g/10 min, 4 g/10 min, and 4.5 g/10 min, then the sum of the product of each layer of the first portion is (0.1×3.5)+(0.2×4)+(0.3×4.5)=2.5.

The present invention provides a polymer film that can be used to prepare laminated glass with excellent acoustic insulation effect, excellent optical properties and excellent safety property (high mechanical strength). The polymer film of the present invention and the applications thereof are described in detail below.

1. Polymer Film 1.1. Properties of Polymer Film

The polymer film of the present invention comprises a first portion and a second portion, and the first portion and the second portion independently consist of one or more layers and have the following properties.

Each layer of the first portion independently has a melt index ranging from 3.5 g/10 min to 10.0 g/10 min. For example, the melt index of each layer of the first portion can be 3.5 g/10 min, 3.6 g/10 min, 3.7 g/10 min, 3.8 g/10 min, 3.9 g/10 min, 4.0 g/10 min, 4.1 g/10 min, 4.2 g/10 min, 4.3 g/10 min, 4.4 g/10 min, 4.5 g/10 min, 4.6 g/10 min, 4.7 g/10 min, 4.8 g/10 min, 4.9 g/10 min, 5.0 g/10 min, 5.1 g/10 min, 5.2 g/10 min, 5.3 g/10 min, 5.4 g/10 min, 5.5 g/10 min, 5.6 g/10 min, 5.7 g/10 min, 5.8 g/10 min, 5.9 g/10 min, 6.0 g/10 min, 6.1 g/10 min, 6.2 g/10 min, 6.3 g/10 min, 6.4 g/10 min, 6.5 g/10 min, 6.6 g/10 min, 6.7 g/10 min, 6.8 g/10 min, 6.9 g/10 min, 7.0 g/10 min, 7.1 g/10 min, 7.2 g/10 min, 7.3 g/10 min, 7.4 g/10 min, 7.5 g/10 min, 7.6 g/10 min, 7.7 g/10 min, 7.8 g/10 min, 7.9 g/10 min, 8.0 g/10 min, 8.1 g/10 min, 8.2 g/10 min, 8.3 g/10 min, 8.4 g/10 min, 8.5 g/10 min, 8.6 g/10 min, 8.7 g/10 min, 8.8 g/10 min, 8.9 g/10 min, 9.0 g/10 min, 9.1 g/10 min, 9.2 g/10 min, 9.3 g/10 min, 9.4 g/10 min, 9.5 g/10 min, 9.6 g/10 min, 9.7 g/10 min, 9.8 g/10 min, 9.9 g/10 min, or 10.0 g/10 min, or within a range between any two of the values described herein. The first portion with the designated melt index can attenuate sound vibration, thereby optimizing acoustic insulation effect.

Each layer of the second portion independently has a melt index lower than 3.5 g/10 min. Preferably, each layer of the second portion independently has a melt index ranging from 1.5 g/10 min to 3.3 g/10 min. For example, the melt index of each layer of the second portion can be 1.5 g/10 min, 1.6 g/10 min, 1.7 g/10 min, 1.8 g/10 min, 1.9 g/10 min, 2.0 g/10 min, 2.1 g/10 min, 2.2 g/10 min, 2.3 g/10 min, 2.4 g/10 min, 2.5 g/10 min, 2.6 g/10 min, 2.7 g/10 min, 2.8 g/10 min, 2.9 g/10 min, 3.0 g/10 min, 3.1 g/10 min, 3.2 g/10 min, 3.3 g/10 min, or 3.4 g/10 min, or within a range between any two of the values described herein.

Each layer of the first portion independently has a thickness ratio of its thickness to the total thickness of the first portion and the second portion, and a product of its melt index and the thickness ratio (i.e., melt index×thickness ratio). The sum of the product of each layer of the first portion ranges from 0.39 g/10 min to 2.50 g/10 min. For example, the sum of the product of each layer of the first portion can be 0.39 g/10 min, 0.40 g/10 min, 0.45 g/10 min, 0.50 g/10 min, 0.55 g/10 min, 0.60 g/10 min, 0.65 g/10 min, 0.70 g/10 min, 0.75 g/10 min, 0.80 g/10 min, 0.85 g/10 min, 0.90 g/10 min, 0.95 g/10 min, 1.00 g/10 min, 1.05 g/10 min, 1.10 g/10 min, 1.15 g/10 min, 1.20 g/10 min, 1.25 g/10 min, 1.30 g/10 min, 1.35 g/10 min, 1.40 g/10 min, 1.45 g/10 min, 1.50 g/10 min, 1.55 g/10 min, 1.60 g/10 min, 1.65 g/10 min, 1.70 g/10 min, 1.75 g/10 min, 1.80 g/10 min, 1.85 g/10 min, 1.90 g/10 min, 1.95 g/10 min, 2.00 g/10 min, 2.05 g/10 min, 2.10 g/10 min, 2.15 g/10 min, 2.20 g/10 min, 2.25 g/10 min, 2.30 g/10 min, 2.35 g/10 min, 2.40 g/10 min, 2.45 g/10 min, or 2.50 g/10 min, or within a range between any two of the values described herein.

Each layer of the second portion independently has a thickness ratio of its thickness to the total thickness of the first portion and the second portion and a product of its melt index and the thickness ratio (i.e., melt index×thickness ratio). The sum of the product of each layer of the second portion ranges from 1.10 g/10 min to 2.95 g/10 min. For example, the sum of the product of each layer of the second portion can be 1.10 g/10 min, 1.15 g/10 min, 1.20 g/10 min, 1.25 g/10 min, 1.30 g/10 min, 1.35 g/10 min, 1.40 g/10 min, 1.45 g/10 min, 1.50 g/10 min, 1.55 g/10 min, 1.60 g/10 min, 1.65 g/10 min, 1.70 g/10 min, 1.75 g/10 min, 1.80 g/10 min, 1.85 g/10 min, 1.90 g/10 min, 1.95 g/10 min, 2.00 g/10 min, 2.05 g/10 min, 2.10 g/10 min, 2.15 g/10 min, 2.20 g/10 min, 2.25 g/10 min, 2.30 g/10 min, 2.35 g/10 min, 2.40 g/10 min, 2.45 g/10 min, 2.50 g/10 min, 2.55 g/10 min, 2.60 g/10 min, 2.65 g/10 min, 2.70 g/10 min, 2.75 g/10 min, 2.80 g/10 min, 2.85 g/10 min, 2.90 g/10 min, or 2.95 g/10 min, or within a range between any two of the values described herein.

The research shows that, only when the melt index of each layer of the first portion and the second portion are within the aforementioned ranges, and the sum of the product of melt index and thickness ratio of each layer of the first portion and the second portion are within the aforementioned ranges, the laminated glass using the polymer film of the present invention can be provided with excellent acoustic insulation effect, excellent optical properties and excellent safety property (high mechanical strength).

1.2. Structure of Polymer Film

The polymer film of the present invention comprises a first portion and a second portion, and the first portion and the second portion independently consist of one or more layer. Alternatively, the polymer film of the present invention essentially consists of the first portion and the second portion, or the polymer film of the present invention consists of the first portion and the second portion.

In the polymer film of the present invention, the first portion and the second portion are laminated with each other, meaning that each layer of the first portion and each layer of the second portion are stacked in an arbitrary order. For example, when the first portion consists of two layers of layer A and the second portion consists of three layers of layer B, the stacking order can be but are not limited to AABBB, ABABB, ABBAB, ABBBA, BABAB, or BBAAB.

In some embodiments of the present invention, the one or more layers of the first portion constitute first sub-portion(s), the one or more layers of the second portion constitute second sub-portion(s), and each of the first sub-portions and the second sub-portions can independently comprise one or more layers. The number of the first sub-portion(s) is M and the number of the second sub-portion(s) is N, M and N are independently positive integers, such as integers of 1 (one) to 5. The first sub-portion(s) and the second sub-portion(s) are arranged alternatively. For example, when M is 2 and N is 2, the polymer film consists of the first sub-portion, the second sub-portion, the first sub-portion and the second sub-portion in sequence. When M is 2 and N is 3, the polymer film consists of the second sub-portion, the first sub-portion, the second sub-portion, the first sub-portion and the second sub-portion in sequence. When M is 3 and N is 2, the polymer film consists of the first sub-portion, the second sub-portion, the first sub-portion, the second sub-portion and the first sub-portion in sequence. In the preferred embodiments of the present invention, N is M+1. In the more preferred embodiments of the present invention, M is 1 (one) or 2, and N is M+1.

1.3. Constituents of Polymer Film

In the polymer film of the present invention, each layer of the first portion and each layer of the second portion independently comprise polyvinyl acetal as an essential constituent, and each layer of the first portion and each layer of the second portion independently may further comprise other optional constituents, such as a plasticizer or other conventional additives, depending on the need. As used herein, the expression "each layer of the first portion and each layer of the second portion independently comprise polyvinyl acetal" means that every layers of the first portion and the second portion comprise polyvinyl acetal, and the polyvinyl acetal comprised in each layer of the first portion or the second portion can be identical or different. In some embodiments of the present invention, each layer of the first portion and each layer of the second portion can independently comprise polyvinyl acetal and a plasticizer, and the polyvinyl acetal and the plasticizer comprised in each layer may be identical or different. Alternatively, each layer of the first portion and each layer of the second portion independently consist essentially of or consist of polyvinyl acetal and a plasticizer, and the polyvinyl acetal and the plasticizer comprised in each layer may be identical or different.

1.3.1. Polyvinyl Acetal

Examples of polyvinyl acetal include but are not limited to poly(vinyl formal), poly(vinyl acetal), poly(vinyl butyral), poly(vinyl pentanal), and poly(vinyl hexanal). The above polyvinyl acetal can either be used alone or in a mixture of two or more. In the preferred embodiments of the present invention, the polyvinyl acetal is poly(vinyl butyral).

1.3.1.1. Polyvinyl Acetal Comprised in First Portion

In some embodiments of the present invention, the polyvinyl acetal comprised in each layer of the first portion independently has a number average molecular weight (Mn) ranging from 100,000 to 240,000. For example, the Mn of the polyvinyl acetal comprised in each layer of the first portion can be independently 100,000, 105,000, 110,000, 115,000, 120,000, 125,000, 130,000, 135,000, 140,000, 145,000, 150,000, 155,000, 160,000, 165,000, 170,000, 175,000, 180,000, 185,000, 190,000, 195,000, 200,000, 205,000, 210,000, 215,000, 220,000, 225,000, 230,000, 235,000, or 240,000, or within a range between any two of the values described herein. Higher number average molecular weight of polymer indicates higher degree of polymerization of polymer, and thus lower fluidity of polymer and lower melt index of polymer. Lower number average molecular weight of polymer indicates higher melt index of polymer.

In some embodiments of the present invention, based on the total number of moles of hydroxyl, acetal group, and acetyl group of polyvinyl acetal comprised in each layer of the first portion, the polyvinyl acetal comprised in each layer of the first portion can independently have a content of acetal group (i.e., a degree of acetalization) ranging from 56 mol % to 74 mol %. For example, based on the total number of moles of hydroxyl, acetal group, and acetyl group of polyvinyl acetal comprised in each layer of the first portion, the degree of acetalization of the polyvinyl acetal comprised in each layer of the first portion can be independently 56 mol %, 56.5 mol %, 57 mol %, 57.5 mol %, 58 mol %, 58.5 mol %, 59 mol %, 59.5 mol %, 60 mol %, 60.5 mol %, 61 mol %, 61.5 mol %, 62 mol %, 62.5 mol %, 63 mol %, 63.5 mol %, 64 mol %, 64.5 mol %, 65 mol %, 65.5 mol %, 66 mol %, 66.5 mol %, 67 mol %, 67.5 mol %, 68 mol %, 68.5 mol %, 69 mol %, 69.5 mol %, 70 mol %, 70.5 mol %, 71 mol %, 71.5 mol %, 72 mol %, 72.5 mol %, 73 mol %, 73.5 mol %, or 74 mol %, or within a range between any two of the values described herein. In the preferred embodiments of the present invention, based on the total number of moles of hydroxyl, acetal group, and acetyl group of polyvinyl acetal comprised in each layer of the first portion, the polyvinyl acetal comprised in each layer of the first portion independently has a degree of acetalization ranging from 60 mol % to 71 mol %.

In some embodiments of the present invention, based on the total number of moles of hydroxyl, acetal group, and acetyl group of polyvinyl acetal comprised in each layer of the first portion, the polyvinyl acetal comprised in each layer of the first portion can independently have a content of acetyl group (i.e., a degree of acetylization) ranging from 5 mol % to 15 mol %. For example, based on the total number of moles of hydroxyl, acetal group, and acetyl group of polyvinyl acetal comprised in each layer of the first portion, the degree of acetylization of the polyvinyl acetal comprised in each layer of the first portion can be independently 5 mol %, 5.5 mol %, 6 mol %, 6.5 mol %, 7 mol %, 7.5 mol %, 8 mol %, 8.5 mol %, 9 mol %, 9.5 mol %, 10 mol %, 10.5 mol %, 11 mol %, 11.5 mol %, 12 mol %, 12.5 mol %, 13 mol %, 13.5 mol %, 14 mol %, 14.5 mol %, or 15 mol %, or within a range between any two of the values described herein. In the preferred embodiments of the present invention, based on the total number of moles of hydroxyl, acetal group, and acetyl group of polyvinyl acetal comprised in each layer of the first portion, the polyvinyl acetal comprised in each layer of the first portion independently has a degree of acetylization ranging from 7 mol % to 12 mol %.

In some embodiments of the present invention, based on the total number of moles of hydroxyl, acetal group, and acetyl group of polyvinyl acetal comprised in each layer of the first portion, the polyvinyl acetal comprised in each layer of the first portion can independently have a content of hydroxyl ranging from 20 mol % to 30 mol %. For example, based on the total number of moles of hydroxyl, acetal group, and acetyl group of polyvinyl acetal comprised in each layer of the first portion, the content of hydroxyl of the polyvinyl acetal comprised in each layer of the first portion can be independently 20 mol %, 20.5 mol %, 21 mol %, 21.5 mol %, 22 mol %, 22.5 mol %, 23 mol %, 23.5 mol %, 24 mol %, 24.5 mol %, 25 mol %, 25.5 mol %, 26 mol %, 26.5 mol %, 27 mol %, 27.5 mol %, 28 mol %, 28.5 mol %, 29 mol %, 29.5 mol %, or 30 mol %, or within a range between any two of the values described herein. In the preferred embodiments of the present invention, based on the total number of moles of hydroxyl, acetal group, and acetyl group of polyvinyl acetal comprised in each layer of the first portion, the polyvinyl acetal comprised in each layer of the first portion independently has a content of hydroxyl ranging from 22 mol % to 28 mol %. The lower the hydroxyl content of polyvinyl acetal, the higher the amount of the plasticizer that can be absorbed by the polyvinyl acetal.

1.3.1.2. Polyvinyl Acetal Comprised in Second Portion

In some embodiments of the present invention, the polyvinyl acetal comprised in each layer of the second portion independently has a number average molecular weight (Mn) ranging from 90,000 to 120,000. For example, the Mn of the polyvinyl acetal comprised in each layer of the second portion can be independently 90,000, 91,000, 92,000, 93,000, 94,000, 95,000, 96,000, 97,000, 98,000, 99,000, 100,000, 101,000, 102,000, 103,000, 104,000, 105,000, 106,000, 107,000, 108,000, 109,000, 110,000, 111,000, 112,000, 113,000, 114,000, 115,000, 116,000, 117,000, 118,000, 119,000, or 120,000, or within a range between any two of the values described herein.

In some embodiments of the present invention, based on the total number of moles of hydroxyl, acetal group, and acetyl group of polyvinyl acetal comprised in each layer of the second portion, the polyvinyl acetal comprised in each layer of the second portion can independently have a content of acetal group (i.e., a degree of acetalization) ranging from 60 mol % to 75 mol %. For example, based on the total number of moles of hydroxyl, acetal group, and acetyl group of polyvinyl acetal comprised in each layer of the second portion, the degree of acetalization of the polyvinyl acetal comprised in each layer of the second portion can be independently 60 mol %, 60.5 mol %, 61 mol %, 61.5 mol %, 62 mol %, 62.5 mol %, 63 mol %, 63.5 mol %, 64 mol %, 64.5 mol %, 65 mol %, 65.5 mol %, 66 mol %, 66.5 mol %, 67 mol %, 67.5 mol %, 68 mol %, 68.5 mol %, 69 mol %, 69.5 mol %, 70 mol %, 70.5 mol %, 71 mol %, 71.5 mol %, 72 mol %, 72.5 mol %, 73 mol %, 73.5 mol %, 74 mol %, 74.5 mol %, or 75 mol %, or within a range between any two of the values described herein. In the preferred embodiments of the present invention, based on the total number of moles of hydroxyl, acetal group, and acetyl group of polyvinyl acetal comprised in each layer of the second portion, the polyvinyl acetal comprised in each layer of the second portion independently has a degree of acetalization ranging from 70 mol % to 72 mol %.

In some embodiments of the present invention, based on the total number of moles of hydroxyl, acetal group, and acetyl group of polyvinyl acetal comprised in each layer of the second portion, the polyvinyl acetal comprised in each layer of the second portion can independently have a content of acetyl group (i.e., a degree of acetylization) ranging from 0.1 mol % to 5 mol %. For example, based on the total number of moles of hydroxyl, acetal group, and acetyl group of polyvinyl acetal comprised in each layer of the second portion, the degree of acetylization of the polyvinyl acetal comprised in each layer of the second portion can be independently 0.1 mol %, 0.5 mol %, 1 mol %, 1.5 mol %, 2 mol %, 2.5 mol %, 3 mol %, 3.5 mol %, 4 mol %, 4.5 mol %, or 5 mol %, or within a range between any two of the values described herein. In the preferred embodiments of the present invention, based on the total number of moles of hydroxyl, acetal group, and acetyl group of polyvinyl acetal comprised in each layer of the second portion, the polyvinyl acetal comprised in each layer of the second portion independently has a degree of acetylization ranging from 0.5 mol % to 1.5 mol %.

In some embodiments of the present invention, based on the total number of moles of hydroxyl, acetal group, and acetyl group of polyvinyl acetal comprised in each layer of the second portion, the polyvinyl acetal comprised in each layer of the second portion can independently have a content of hydroxyl ranging from 20 mol % to 35 mol %. For example, based on the total number of moles of hydroxyl, acetal group, and acetyl group of polyvinyl acetal comprised in each layer of the second portion, the content of hydroxyl of the polyvinyl acetal comprised in each layer of the second portion can be independently 20 mol %, 20.5 mol %, 21 mol %, 21.5 mol %, 22 mol %, 22.5 mol %, 23 mol %, 23.5 mol %, 24 mol %, 24.5 mol %, 25 mol %, 25.5 mol %, 26 mol %, 26.5 mol %, 27 mol %, 27.5 mol %, 28 mol %, 28.5 mol %, 29 mol %, 29.5 mol %, 30 mol %, 30.5 mol %, 31 mol %, 31.5 mol %, 32 mol %, 32.5 mol %, 33 mol %, 33.5 mol %, 34 mol %, 34.5 mol %, or 35 mol %, or within a range between any two of the values described herein. In the preferred embodiments of the present invention, based on the total number of moles of hydroxyl, acetal group, and acetyl group of polyvinyl acetal comprised in each layer of the second portion, the polyvinyl acetal comprised in each layer of the second portion independently has a content of hydroxyl ranging from 27 mol % to 29 mol %.

1.3.2. Plasticizer

As used herein, a plasticizer, also called a plasticizing agent, is a chemical substance that can modify the plasticity of a thermoplastic resin. In general, the higher the added amount of the plasticizer, the higher the melt index of the polymer film. The types of the plasticizer are not particularly limited, and the plasticizer comprised in each layer of the first portion and each layer of the second portion may be identical or different. Examples of the plasticizer include but are not limited to esters of polybasic acids or polyhydric alcohols, such as triethylene glycol bis(2-ethylhexanoate), tetraethylene glycol bis(2-ethylhexanoate), triethylene glycol bis(2-ethylbutyrate), tetraethylene glycol bis(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, bis[2-(2-butoxyethoxy)ethyl]adipate, polymeric adipates, dipropylene glycol dibenzoate, tripropylene glycol dibenzoate, polypropylene glycol dibenzoate, isodecyl benzoate, 2-ethylhexyl benzoate, propylene glycol dibenzoate, diisononyl phthalate, dibutoxyethyl terephthalate, castor oil, methyl ricinoleate, soybean oils, epoxidized soybean oils, and combinations thereof. In the appended examples, triethylene glycol bis(2-ethylhexanoate) is used as the plasticizer.

In some embodiments of the present invention, each layer of the first portion independently comprises a plasticizer in an amount ranging from 55 parts by weight to 85 parts by weight based on 100 parts by weight of the polyvinyl acetal comprised therein. For example, based on 100 parts by weight of the polyvinyl acetal comprised in each layer of the first portion, the amount of the plasticizer comprised in each layer of the first portion can be 55 parts by weight, 56 parts by weight, 57 parts by weight, 58 parts by weight, 59 parts by weight, 60 parts by weight, 61 parts by weight, 62 parts by weight, 63 parts by weight, 64 parts by weight, 65 parts by weight, 66 parts by weight, 67 parts by weight, 68 parts by weight, 69 parts by weight, 70 parts by weight, 71 parts by weight, 72 parts by weight, 73 parts by weight, 74 parts by weight, 75 parts by weight, 76 parts by weight, 77 parts by weight, 78 parts by weight, 79 parts by weight, 80 parts by weight, 81 parts by weight, 82 parts by weight, 83 parts by weight, 84 parts by weight, or 85 parts by weight, or within a range between any two of the values described herein. In the preferred embodiments of the present invention, each layer of the first portion independently comprises a plasticizer in an amount ranging from 60 parts by weight to 80 parts by weight based on 100 parts by weight of the polyvinyl acetal comprised therein.

In some embodiments of the present invention, each layer of the second portion independently comprises a plasticizer in an amount ranging from 30 parts by weight to 50 parts by weight based on 100 parts by weight of the polyvinyl acetal comprised therein. For example, based on 100 parts by weight of the polyvinyl acetal comprised in each layer of the second portion, the amount of the plasticizer comprised in each layer of the second portion can be 30 parts by weight, 31 parts by weight, 32 parts by weight, 33 parts by weight, 34 parts by weight, 35 parts by weight, 36 parts by weight, 37 parts by weight, 38 parts by weight, 39 parts by weight, 40 parts by weight, 41 parts by weight, 42 parts by weight, 43 parts by weight, 44 parts by weight, 45 parts by weight, 46 parts by weight, 47 parts by weight, 48 parts by weight, 49 parts by weight, or 50 parts by weight, or within a range between any two of the values described herein. In the preferred embodiments of the present invention, each layer of the second portion independently comprises a plasticizer in an amount ranging from 38 parts by weight to 44 parts by weight based on 100 parts by weight of the polyvinyl acetal comprised therein.

1.3.3. Other Conventional Additives

Conventional additives include any substances that can adaptively improve the workability of the polymer film during its manufacture or impart specific functions to the polymer film. The aforementioned specific functions include but are not limited to one or more of the following functions: thermal insulation function, reflection function, anti-reflection function, refraction function, anti-refraction function, light-splitting function, and dimming function.

Examples of the conventional additives include but are not limited to dyes, pigments, stabilizers, antioxidants, flame retardants, infrared absorbers, infrared blocking agents, ultraviolet absorbers, ultraviolet stabilizers, lubricants, dispersing agents, surfactants, chelating agents, coupling agents, binders, and adhesion controlling agents. For example, the polymer film can comprise a dye or a pigment to form a colored polymer film. Alternatively, the polymer film can comprise an ultraviolet absorber or an infrared absorber to form a polymer film with an anti-ultraviolet function or an anti-infrared function. The above-mentioned additives can be used alone or in a mixture of two or more. In addition, the above-mentioned additives can be added in one or more layers of the first portion of the polymer film, one or more layers of the second portion of the polymer film, or one or more layers of the first portion and the second portion of the polymer film.

1.4. Other Properties of Polymer Film

In the preferred embodiments of the present invention, based on the total thickness of the first portion and the second portion, the thickness ratio of the first portion (i.e., the thickness ratio of the thickness of the first portion to the total thickness of the first portion and the second portion) is 0.05 to 0.4, such as 0.05, 0.1, 0.15, 0.2, 0.25, 0.3, 0.35, or 0.4, or within a range between any two of the values described herein. Based on the total thickness of the first portion and the second portion, the thickness ratio of the second portion (i.e., the thickness ratio of the thickness of the second portion to the total thickness of the first portion and the second portion) is 0.6 to 0.95, such as 0.6, 0.65, 0.7, 0.75, 0.8, 0.85, 0.9, or 0.95 or within a range between any two of the values described herein.

With the proviso that the polymer film satisfies the designated melt indexes and the sum of the product of melt index to thickness ratio, the total thickness of the polymer film of the present invention as well as the thickness of each layer of the first portion and the thickness of each layer of the second portion can be adjusted depending on the need. In general, the total thickness of the polymer film of the present invention can be 0.1 mm to 2.5 mm, such as 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, 1.0 mm, 1.05 mm, 1.1 mm, 1.15 mm, 1.2 mm, 1.25 mm, 1.3 mm, 1.35 mm, 1.4 mm, 1.45 mm, 1.5 mm, 1.55 mm, 1.6 mm, 1.65 mm, 1.7 mm, 1.75 mm, 1.8 mm, 1.85 mm, 1.9 mm, 1.95 mm, 2.0 mm, 2.05 mm, 2.1 mm, 2.15 mm, 2.2 mm, 2.25 mm, 2.3 mm, 2.35 mm, 2.4 mm, 2.45 mm, or 2.5 mm, or within a range between any two of the values described herein. In the appended examples, the thickness of the polymer film is 0.76 mm to 0.85 mm.

In some embodiments of the present invention, the thickness of each layer of the first portion can be independently 50 m to 250 m, such as 50 m, 60 m, 70 m, 80 m, 90 m, 100 m, 110 am, 120 am, 130 am, 140 am, 150 am, 160 am, 170 am, 180 am, 190 am, 200 am, 210 am, 220 am, 230 am, 240 am, or 250 am, or within a range between any two of the values described herein.

In some embodiments of the present invention, the thickness of each layer of the second portion can be independently 250 m to 450 am, such as 250 am, 260 am, 270 am, 280 am, 290 am, 300 am, 310 am, 320 am, 330 am, 340 am, 350 am, 360 am, 370 am, 380 am, 390 am, 400 am, 410 am, 420 am, 430 am, 440 am, or 450 am, or within a range between any two of the values described herein.

1.5. Manufacture of Polymer Film

The method for manufacturing the polymer film of the present invention is not particularly limited. For example, the polymer film of the present invention may be manufactured by mixing, dry-stirring and compounding the polyvinyl acetal and optional constituents (e.g., a plasticizer) to obtain a polymer composition, using the polymer composition to provide a polymer film by means of a conventional film forming method, and performing a machine embossing step on the surface of the polymer film. Examples of the conventional film forming method include but are not limited to a calendering method, a casting method, an extrusion stretching method, a direct extruding method, and an extrusion blowing method.

In some embodiments of the present invention, the polymer film is manufactured as follows, but the present invention is not limited thereto: providing a first polymer film composition for manufacturing each layer of the first portion and a second polymer film composition for manufacturing each layer of the second portion; and placing the first polymer film composition and the second polymer film composition into a co-extruder to form the polymer film of the present invention by means of co-extruding.

The first polymer film composition and the second polymer film composition can be independently prepared as follows, but the present invention is not limited thereto: pre-heating a selected polyvinyl acetal resin in an oven; dry-stirred the pre-heated polyvinyl acetal and a plasticizer to obtained a dry-stirred mixture; and compounding the dry-stirred mixture by using a twin-screw compounder to obtain the desired first polymer film composition or second polymer film composition.

Without being limited by any theories, it is believed that the melt index of the polymer film can be adjusted by controlling the amount of functional groups of polymer, the plasticizer amount in the polymer film, and the uniformity of absorption of the plasticizer in the polymer. The uniformity of absorption of the plasticizer in the polymer can be adjusted by controlling the pre-heating temperature, the dry-stirring temperature, the dry-stirring time, the compounding temperature, and the compounding time during the manufacture of the polymer film. In general, pre-heating can expand the pores between polymer material to slightly increase the fluidity of resin to facilitate the subsequent mixing with the plasticizer. A higher dry-stirring temperature can facilitate the expansion of the pores and thus the absorption of the plasticizer. A longer dry-stirring time can make the mixing of resin and the plasticizer more uniform. A higher compounding temperature can improve the fluidity of the plasticizer, thereby increasing the compatibility of resin and the plasticizer. A longer compounding time can make the mixing of resin and the plasticizer more uniform. In addition, the amount of the functional groups of polymer will also affect the uniformity of absorption of the plasticizer in polymer. In view of the above, in the appended examples, in addition to adjusting the constitution of the first polymer film composition and the second polymer film composition, the polymer film with the melt index features required by the present invention is also provided with the following conditions: a pre-heating temperature of 30° C. to 45° C.; a dry-stirring temperature of 30° C. to 45° C.; a dry-stirring time of 2 minutes to 3 minutes; a compounding temperature of 180° C. to 210° C.; and a compounding time of 8 minutes to 12 minutes.

A concavo-convex structure can be formed on the surface of the co-extruded polymer film through pre-heating and machine embossing to facilitate de-airing. The machine embossing is directed to a process of forming textures on the surface of the polymer film by using a roller. Examples of machine embossing methods include but are not limited to an embossing roller method or a calendering roller method. The embossing roller method is preferred. The texture types provided by the machine embossing are not limited and include rhombus texture, line texture, sawtooth texture, square texture, taper texture, circle texture, sub-circle texture, and irregular texture. The above-mentioned texture types can be used alone or in a combination of two or more. The conditions for pre-heating and machine embossing can be adaptively adjusted depending on the composition of the polymer film.

2. Laminated Glass

The polymer film of the present invention can be used to manufacture a laminated glass. Thus, the present invention also provides a laminated glass, which comprises a first glass sheet, an intermediate film, and a second glass sheet in sequence, wherein the intermediate film is provided by the aforementioned polymer film.

The first glass sheet and the second glass sheet may be identical to or different from each other. The first glass sheet and the second glass sheet can be independently any conventional glass sheet for manufacturing a laminated glass. The conventional glass sheet for manufacturing laminated glass include but are not limited to a float glass sheet, a tempered glass sheet, a wired glass sheet, or a plain plate-glass sheet, but the present invention is not limited thereto. In the appended examples, float glass sheets are used as the first glass sheet and the second glass sheet.

The laminated glass of the present invention can be manufactured by any laminated glass manufacturing method known in the art. In general, the method of manufacturing laminated glass can be roughly divided to a pre-pressing step and an autoclave pressing step. The pre-pressing step is as follows. First, a polymer film is interposed between two glass sheets to obtain a laminated object. Then, the conveying rate of the conveyor belt of roller press is set to 2 m/min to 8 m/min, the temperature of oven is set to 160° C. to 190° C., and the pressure of rollers is set to 3 kg/cm² to 10 kg/cm². The laminated object is placed on the conveyor belt and passed through the oven and the rollers in sequence, wherein the distance between the rollers is set to 4.5 mm to 6.5 mm. Afterwards, the roller-pressed laminated object is cooled to room temperature to complete pre-pressing. Next, the pre-pressed laminated object is placed in an autoclave to perform the autoclave pressing step. The autoclave pressing step includes subjecting the pre-pressed laminated object to hot-pressing under a high pressure and temperature condition for 100 minutes to 150 minutes to obtain laminated glass. In general, the high pressure and temperature condition refers to a pressure ranging from 10 bar to 15 bar and a temperature ranging from 100° C. to 150° C.

3. Example 3.1. Testing Methods

The present invention is further illustrated by the embodiments hereinafter, wherein the testing instruments and methods are as follows.

[Measurement of Acetalization Degree, Acetylization Degree and Hydroxyl Content of Polyvinyl Acetal]

The acetalization degree, acetylization degree and hydroxyl content of polyvinyl acetal are measured in accordance with JIS K6728:1977.

[Measurement of Molecular Weight Distribution of Polyvinyl Acetal]

The molecular weight distribution of polyvinyl acetal is measured by means of gel permeation chromatography (GPC), wherein polyvinyl acetal is dissolved in tetrahydrofuran (THF) and subjected to GPC analysis under the conditions below. The molecular weight (Mn) of polyvinyl acetal is calculated based on the ratio corresponding to the area of standard polystyrene (Water PS STD).

Device: Waters 1515 PUMP system
Detector: Waters 2414 RI
Elution condition: 1.0 mL/min, THE
Column: Waters Styragel HR5 THF, Waters Styragel HR4 THF, Waters Styragel HR3 THF, Waters Styragel HR1 THE

[Measurement of Melt Index]

The melt index of the polymer film is measured using a melt index tester (model: D4002HV, available from Dynisco) in accordance with ASTM D1238. The calculation of the weight of the outflow is performed in accordance with Manual Operation Method (Method A). The measuring conditions are 190° C. and a loading of 2.16 kg, and the weight of the sample of the polymer film is 6 g. The detailed measuring steps are as follows. First, the sample of the polymer film is placed in a constant temperature and humidity chamber at 23° C. and a relative humidity of 25% for 2 hours. Then, the melt index tester is turned on and heated to 190° C., and the sample is added and packed into a cylindrical barrel. A standard weight applied through the piston and weights (total weight: 2.16 kg) are placed on the sample in the cylindrical barrel, and the outflow of sample within 120 seconds is excluded from calculation. After 120 seconds, the formal test is started. The amount of the outflow of sample is weighed every 200 seconds for three times. The melt index is calculated according to the following equation. The unit of melt index is g/10 min.

$$MI = \frac{\text{Total weight of outflow (unit:g)}}{\text{Collecting time of outflow (10 minutes)}}$$

[Evaluation of Continuous Layer Structure]

The polymer film is observed using an optical microscope (model: BX51, available from Olympus) to check whether the structure of each layer is continuous or not. The polymer film is cut into a sample of 100 cm×5 cm, wherein 100 cm is the length in the transverse direction and 5 cm is the length in the machine direction. The sample is clamped at the two short sides using a clamping jig such that the long side (i.e., the cutting surface) of the polymer film faces toward the objective lens. The arrangement of the optical microscope is as follows: the magnification of the objective lens is 5×. The criteria for evaluating are as follows. When the structure of each layer of the polymer film is continuous and no discontinuity is observed, the structural uniformity is good, and the result is recorded as "o". When discontinuity is observed in any layer of the polymer film, the structural uniformity is poor, and the result is recorded as "x".

[Evaluation of Layer Thickness]

The thickness of each layer of the first portion and each layer of the second portion of the polymer film is measured using an optical microscope (model: BX51, available from Olympus), and the thickness is calculated using a built-in software (Motic Image Plus 2.0) of the optical microscope. The polymer film is cut into a sample of 100 cm×5 cm, wherein 100 cm is the length in the transverse direction and 5 cm is the length in the machine direction. The sample is clamped at the two short sides using a clamping jig such that the long side (i.e., the cutting surface) of the polymer film faces toward the objective lens. The arrangement of the optical microscope is as follows: the magnification of the objective lens is 5×. The measuring manner of each layer of the first portion and each layer of the second portion is as follows: from the left boundary, measuring the thickness of the layer at 1 (one) cm, 25 cm, 50 cm, 75 cm, and 100 cm, respectively, to obtain five values of thickness. The thickness of each layer of the first portion and each layer of the second portion is obtained by averaging the five values.

[Evaluation of Loss Factor]

The loss factor of laminated glass is evaluated in accordance with ISO 16940: 2008, measurement of mechanical impedance (MIM). The sample is prepared as follows. First, a polymer film with a length of 300 mm and a width of 25 mm is interposed between two float glass sheets (length: 300 mm, width: 25 mm, thickness: 2 mm) to obtain a laminated object. The laminated object is subjected to a pre-pressing step and an autoclave pressing step to obtain a laminated glass, wherein the pre-pressing step and the autoclave pressing step are as described previously. Next, the laminated glass is placed in a constant temperature and humidity chamber at 23° C. and a relative humidity of 55% for 2 hours. Afterwards, the test of loss factor is performed as follows. First, the center part of the laminated glass is secured to a vibration shaker and the laminated glass is oscillated at an ambient temperature of 20° C. Then, the force that oscillate the laminated glass and the frequency of oscillating are measured by using an impedance head, and the obtained values are converted to damping loss factor by means of an analysis system. The calculation is performed according to first oscillation mode with half-power method. When the damping loss factor of the laminated glass at 20° C. is higher than 0.25, the laminated glass can provide good acoustic insulation.

[Falling Ball Test]

The falling ball test is performed in accordance with the Penetration resistance test as recited in JIS R 3212:1998 Standard (hereinafter "Standard 3212") at 23° C. First, five pieces of laminated glass of 30 cm×30 cm are prepared as test samples. Then, the test sample is placed on a steel support frame in accordance with Standard 3212, and a steel ball with a weight of 2260 g and a diameter of 82 mm is placed above the test sample 5 m. Let the steel ball freely fall onto the test sample, and check whether the steel ball penetrates the sample or not. The test is performed five times. If the test sample is not penetrated by the steel ball in any of the five tests, the falling ball test is passed and the results is recorded as "o". If the test sample is penetrated in any of the five tests, the falling ball test is failed and the results is recorded as "x"

[Snowflake Defect Test]

As used herein, "snowflake defects" refer to the defects that look like snowflake and occur between the first portion and the second portion of the polymer film. The snowflake defect usually forms during the manufacture of laminated glass and adversely affects the optical performance of laminated glass. The test for snowflake defect is as follows.

One piece of laminated glass of 15 cm×15 cm is prepared as a test sample. The test sample is placed in an oven at 120°

C. for 2 hours. After the test sample is taken out from the oven, the appearance of the test sample (laminated glass) is observed with unaided eyes. If no snowflake defect is observed, the snowflake defect test is passed and the result is recorded as "o". If any snowflake defect is observed, the snowflake defect test is failed and the result is recorded as "x".

[Measurement of Light Transmittance]

The light transmittance of laminated glass is measured in accordance with ASTM D1003. First, two pieces of plain plate-glass sheet with a length of 6 cm, a width of 6 cm and a thickness of 3 mm are washed by water and dried. Then, a polymer film is placed between the two pieces of glass sheet to obtain a laminated object, and the laminated object is hot-pressed by using a hot-pressing machine at 150° C. and 3 kg/cm$^2$ for 3 minutes to obtain a laminated glass. The surfaces of glass are cleaned by alcohol. Afterwards, the light transmittance of the laminated glass is measured using a haze meter (model: NDH2000 Haze meter, available from Nippon Denshoku). In general, a qualified light transmittance of laminated glass is 87.5% or more.

3.2. Manufacture and Measurement of Properties of Polymer Film 3.2.1. First Portion of Polymer Film 100 parts by weight of poly(vinyl butyral) (PVB, available from Chang Chun Petrochemical Co., Ltd.) was pre-heated in an oven at 30° C. to 45° C. for 1 (one) minute. Then, the pre-heated PVB and a plasticizer were dry-stirred at a first dry-stirring temperature for a first dry-stirring time to obtain a first dry-stirred mixture. Afterwards, the first dry-stirred mixture was compounded by using a twin-screw compounder at a first compounding temperature for a first compounding time to obtain a first polymer film composition of Examples 1 to 11 and Comparative Examples 1 to 11, respectively. The amount of the plasticizer is shown in Table 1-1 and Table 2-1, and the first dry-stirring temperature, the first dry-stirring time, the first compounding temperature and the first compounding time are shown in Table 1-2 and Table 2-2. The properties of the PVB, including the Mn, degree of acetalization, degree of acetylization and hydroxyl content, were measured according to the aforementioned testing methods, and the results are shown in Table 1-1 and Table 2-1. The units for the degree of acetalization, the degree of acetylization and the hydroxyl content are all mol %.

The first polymer film compositions of Examples 1 to 11 and Comparative Examples 1 to 11 were placed in an extruder to obtain a single-layer polymer film (hereinafter "first single-layer polymer film"), respectively. The melt indexes of the first single-layer polymer films were measured respectively according to the aforementioned testing method, and the results are shown in Table 1-6 and Table 2-6, i.e., "Melt index of Layer I". Each of the first polymer film compositions were respectively used as the material of each layer of the first portion of the polymer film of Examples 1 to 11 and Comparative Examples 1 to 11 as described below, and the melt index of each of the first single-layer polymer films represents the melt index of each layer of the first portion.

3.2.2. Second Portion of Polymer Film 100 parts by weight of poly(vinyl butyral) (PVB, available from Chang Chun Petrochemical Co., Ltd.) was pre-heated in an oven at 30° C. to 45° C. for 1 (one) minute. Then, the pre-heated PVB and a plasticizer were dry-stirred at a second dry-stirring temperature for a second dry-stirring time to obtain a second dry-stirred mixture. Afterwards, the second dry-stirred mixture was compounded by using a twin-screw compounder at a second compounding temperature for a second compounding time to obtain a second polymer film composition of Examples 1 to 11 and Comparative Examples 1 to 11, respectively. The amount of the plasticizer is shown in Table 1-3 and Table 2-3, and the second dry-stirring temperature, the second dry-stirring time, the second compounding temperature and the second compounding time are shown in Table 1-4 and Table 2-4. The properties of the PVB, including the Mn, degree of acetalization, degree of acetylization and hydroxyl content, were measured according to the aforementioned testing methods, and the results are shown in Table 1-3 and Table 2-3. The units for the degree of acetalization, degree of acetylization and hydroxyl content are all mol %.

The second polymer film compositions of Examples 1 to 11 and Comparative Examples 1 to 11 were placed in an extruder to obtain a single-layer polymer film (hereinafter "second single-layer polymer film"), respectively. The melt indexes of the second single-layer polymer films were measured respectively according to the aforementioned testing method, and the results are shown in Table 1-7 and Table 2-7, i.e., "Melt index of Layer II". Each of the second polymer film compositions were respectively used as the material of each layer of the second portion of the polymer film of Examples 1 to 11 and Comparative Examples 1 to 11 as described below, and the melt index of each of the second single-layer polymer films represents the melt index of each layer of the second portion.

3.2.3. Manufacture of Polymer Film

The first polymer film compositions of Examples 1 to 11 and Comparative Examples 1 to 11 and the second polymer film compositions of Examples 1 to 11 and Comparative Examples 1 to 11 were respectively placed in a co-extruder to form a polymer film by means of co-extruding. The total thickness of the polymer film is 0.8 mm, and the constitution of the polymer film is shown in Table 1-5 and Table 2-5, wherein "Layer I" represents a layer of the first portion of the polymer film formed from the first polymer film composition, and "Layer II" represents a layer of the second portion of the polymer film formed from the second polymer film composition. The total thickness of Layer I constituting the first portion of the polymer film and the thickness ratio of the total thickness of Layer I to the total thickness of the first portion and the second portion are shown in Table 1-6 and Table 2-6. The total thickness of Layer II constituting the second portion of the polymer film and the thickness ratio of the total thickness of Layer II to the total thickness of the first portion and the second portion are shown in Table 1-7 and Table 2-7. In the embodiments where the polymer film includes two or more layers of Layer I or Layer II, each of Layer I has identical thickness and each of Layer II has identical thickness. Thus, the thickness ratio of each layer can be calculated from the total thickness ratio as recited in the tables, and the product of the melt index of each layer and the thickness ratio as well as the sum of the products can be calculated accordingly.

Afterwards, the two surfaces of the polymer film were subjected to preheating and machine embossing to form textures, thereby obtaining the polymer films of Examples 1 to 11 and Comparative Examples 1 to 11.

TABLE 1-1

Properties of first polymer film composition of Examples 1 to 11

| Property Unit | Mn | Content of hydroxyl mol % | Degree of acetylization mol % | Degree of acetalization mol % | Content of plasticizer parts by weight |
|---|---|---|---|---|---|
| Example 1 | 207900 | 28.0 | 8.2 | 63.8 | 65 |
| 2 | 189000 | 25.6 | 8.2 | 66.2 | 70 |
| 3 | 163800 | 24.8 | 10.3 | 64.9 | 75 |
| 4 | 186000 | 22.0 | 8.6 | 69.4 | 80 |
| 5 | 126000 | 22.5 | 12.0 | 65.5 | 80 |
| 6 | 226800 | 23.4 | 7.0 | 69.6 | 60 |
| 7 | 208000 | 27.4 | 8.5 | 64.1 | 60 |
| 8 | 176400 | 25.9 | 7.3 | 66.8 | 65 |
| 9 | 151200 | 22.8 | 7.9 | 69.3 | 70 |
| 10 | 138600 | 23.7 | 7.6 | 68.7 | 75 |
| 11 | 163800 | 27.7 | 9.4 | 62.9 | 80 |

TABLE 1-2

Preparing parameters of first polymer film composition of Examples 1 to 11

| Parameter Unit | Preheating temperature ° C. | First dry-stirring temperature ° C. | First dry-stirring time minute | First compounding temperature ° C. | First compounding time minute |
|---|---|---|---|---|---|
| Example 1 | 30 | 30 | 3 | 180 | 11 |
| 2 | 35 | 35 | 3 | 190 | 12 |
| 3 | 40 | 40 | 2 | 200 | 10 |
| 4 | 45 | 45 | 2 | 210 | 8 |
| 5 | 45 | 45 | 2 | 210 | 12 |
| 6 | 30 | 30 | 3 | 180 | 8 |
| 7 | 30 | 30 | 3 | 180 | 10 |
| 8 | 35 | 35 | 3 | 190 | 8 |
| 9 | 40 | 40 | 2 | 200 | 8 |
| 10 | 40 | 40 | 2 | 200 | 12 |
| 11 | 45 | 45 | 2 | 210 | 11 |

TABLE 1-3

Properties of second polymer film composition of Examples 1 to 11

| Property Unit | Mn | Content of hydroxyl mol % | Degree of acetylization mol % | Degree of acetalization mol % | Content of plasticizer parts by weight |
|---|---|---|---|---|---|
| Example 1 | 113400 | 28.4 | 1.0 | 70.6 | 38 |
| 2 | 107100 | 28.1 | 1.0 | 70.9 | 38 |
| 3 | 108800 | 28.6 | 1.0 | 70.4 | 40 |
| 4 | 107100 | 28.6 | 1.0 | 70.4 | 44 |
| 5 | 115200 | 27.4 | 1.0 | 71.6 | 38 |
| 6 | 107100 | 27.8 | 1.0 | 71.2 | 44 |
| 7 | 117000 | 27.4 | 1.0 | 71.6 | 39 |
| 8 | 107100 | 28.6 | 1.0 | 70.4 | 38 |
| 9 | 113400 | 28.4 | 1.0 | 70.6 | 39 |
| 10 | 110500 | 27.6 | 1.0 | 71.4 | 42 |
| 11 | 107100 | 28.4 | 1.0 | 70.6 | 39 |

TABLE 1-4

Preparing parameters of second polymer film composition of Examples 1 to 11

| Parameter Unit | Preheating temperature ° C. | Second dry-stirring temperature ° C. | Second dry-stirring time minute | Second compounding temperature ° C. | Second compounding time minute |
|---|---|---|---|---|---|
| Example 1 | 30 | 30 | 3 | 180 | 8 |
| 2 | 30 | 30 | 3 | 180 | 12 |
| 3 | 40 | 40 | 2 | 200 | 10 |
| 4 | 45 | 45 | 2 | 210 | 12 |
| 5 | 30 | 30 | 3 | 180 | 8 |
| 6 | 45 | 45 | 2 | 210 | 12 |
| 7 | 35 | 35 | 3 | 190 | 8 |
| 8 | 30 | 30 | 3 | 180 | 10 |

TABLE 1-4-continued

Preparing parameters of second polymer film composition of Examples 1 to 11

| Parameter Unit | Preheating temperature ° C. | Second dry-stirring temperature ° C. | Second dry-stirring time minute | Second compounding temperature ° C. | Second compounding time minute |
|---|---|---|---|---|---|
| 9 | 35 | 35 | 3 | 190 | 8 |
| 10 | 45 | 45 | 2 | 210 | 10 |
| 11 | 40 | 40 | 2 | 200 | 8 |

TABLE 1-5

Constitution of polymer film of Examples 1 to 11

| | Constitution of polymer film | Number of layers of first portion (Layer I) | Number of layers of second portion (Layer II) |
|---|---|---|---|
| Example 1 | Layer II/Layer I/Layer II/Layer I/Layer II | 2 | 3 |
| Example 2 | Layer II/Layer I/Layer II | 1 | 2 |
| Example 3 | Layer II/Layer I/Layer II | 1 | 2 |
| Example 4 | Layer II/Layer I/Layer II | 1 | 2 |
| Example 5 | Layer II/Layer I/Layer II/Layer I/Layer II | 2 | 3 |
| Example 6 | Layer II/Layer I/Layer II | 1 | 2 |
| Example 7 | Layer II/Layer I/Layer II | 1 | 2 |
| Example 8 | Layer II/Layer I/Layer II/Layer I/Layer II | 2 | 3 |
| Example 9 | Layer II/Layer I/Layer II | 1 | 2 |
| Example 10 | Layer II/Layer I/Layer II | 1 | 2 |
| Example 11 | Layer II/Layer I/Layer II | 1 | 2 |

TABLE 1-6

Properties of polymer film of Examples 1 to 11

| Unit | | Melt index of Layer I g/10 min | Total thickness of Layer I mm | Total thickness ratio of Layer I | Sum of product of melt index of Layer I and thickness ratio of Layer I g/10 min |
|---|---|---|---|---|---|
| Example | 1 | 3.9 | 0.160 | 0.20 | 0.78 |
| | 2 | 5.5 | 0.112 | 0.14 | 0.77 |
| | 3 | 7.4 | 0.136 | 0.17 | 1.26 |
| | 4 | 9.4 | 0.136 | 0.17 | 1.60 |
| | 5 | 10.0 | 0.200 | 0.25 | 2.50 |
| | 6 | 3.5 | 0.088 | 0.11 | 0.39 |
| | 7 | 3.8 | 0.112 | 0.14 | 0.53 |
| | 8 | 4.8 | 0.176 | 0.22 | 1.06 |
| | 9 | 6.2 | 0.136 | 0.17 | 1.05 |
| | 10 | 8.2 | 0.112 | 0.14 | 1.15 |
| | 11 | 9.9 | 0.160 | 0.20 | 1.98 |

TABLE 1-7

Properties of polymer film of Examples 1 to 11

| Unit | | Melt index of Layer II g/10 min | Total thickness of Layer II mm | Total thickness ratio of Layer II | Sum of product of melt index of Layer II and thickness ratio of Layer II g/10 min |
|---|---|---|---|---|---|
| Example | 1 | 1.5 | 0.640 | 0.80 | 1.20 |
| | 2 | 1.9 | 0.688 | 0.86 | 1.63 |
| | 3 | 2.6 | 0.664 | 0.83 | 2.16 |
| | 4 | 3.3 | 0.664 | 0.83 | 2.74 |
| | 5 | 1.5 | 0.600 | 0.75 | 1.13 |
| | 6 | 3.3 | 0.712 | 0.89 | 2.94 |
| | 7 | 2.1 | 0.688 | 0.86 | 1.81 |
| | 8 | 1.7 | 0.624 | 0.78 | 1.33 |
| | 9 | 2.1 | 0.664 | 0.83 | 1.74 |
| | 10 | 3.0 | 0.688 | 0.86 | 2.58 |
| | 11 | 2.3 | 0.640 | 0.80 | 1.84 |

TABLE 2-1

Properties of first polymer film composition of Comparative Examples 1 to 11

| Property Unit | | Mn | Content of hydroxyl mol % | Degree of acetylization mol % | Degree of acetalization mol % | Content of plasticizer parts by weight |
|---|---|---|---|---|---|---|
| Comparative Example | 1 | 234000 | 29.2 | 7.6 | 63.2 | 40 |
| | 2 | 88200 | 22.6 | 8.9 | 68.5 | 60 |
| | 3 | 138600 | 23.7 | 7.6 | 68.7 | 75 |
| | 4 | 226800 | 23.4 | 7.0 | 69.6 | 60 |
| | 5 | 151200 | 22.8 | 7.9 | 69.3 | 70 |
| | 6 | 163800 | 24.8 | 10.3 | 64.9 | 75 |
| | 7 | 63000 | 23.2 | 7.0 | 69.8 | 70 |
| | 8 | 234000 | 29.2 | 7.6 | 63.2 | 40 |

TABLE 2-1-continued

Properties of first polymer film composition of Comparative Examples 1 to 11

| Property Unit | | Mn | Content of hydroxyl mol % | Degree of acetylization mol % | Degree of acetalization mol % | Content of plasticizer parts by weight |
|---|---|---|---|---|---|---|
| | 9 | 226800 | 23.4 | 7.9 | 68.7 | 60 |
| | 10 | 63000 | 22.9 | 11.6 | 65.5 | 70 |
| | 11 | 234000 | 29.2 | 7.6 | 63.2 | 40 |

TABLE 2-2

Preparing parameters of first polymer film composition of Comparative Examples 1 to 11

| Parameter Unit | | Preheating temperature ° C. | First dry-stirring temperature ° C. | First dry-stirring time minute | First compounding temperature ° C. | First compounding time minute |
|---|---|---|---|---|---|---|
| Comparative Example | 1 | 20 | 20 | 1 | 150 | 6 |
| | 2 | 50 | 50 | 1 | 220 | 6 |
| | 3 | 40 | 40 | 2 | 200 | 12 |
| | 4 | 30 | 30 | 3 | 180 | 8 |
| | 5 | 40 | 40 | 2 | 200 | 8 |
| | 6 | 40 | 40 | 2 | 200 | 10 |
| | 7 | 55 | 55 | 1 | 240 | 6 |
| | 8 | 20 | 20 | 1 | 150 | 6 |
| | 9 | 30 | 30 | 3 | 180 | 8 |
| | 10 | 55 | 55 | 1 | 250 | 6 |
| | 11 | 20 | 20 | 1 | 150 | 6 |

TABLE 2-3

Properties of second polymer film composition of Comparative Examples 1 to 11

| Property Unit | | Mn | Content of hydroxyl mol % | Degree of acetylization mol % | Degree of acetalization mol % | Content of plasticizer parts by weight |
|---|---|---|---|---|---|---|
| Comparative Example | 1 | 113400 | 27.6 | 1.0 | 71.4 | 39 |
| | 2 | 107100 | 28.5 | 1.0 | 70.5 | 38 |
| | 3 | 113400 | 27.6 | 1.0 | 71.4 | 39 |
| | 4 | 107100 | 27.5 | 1.0 | 71.5 | 38 |
| | 5 | 63000 | 25.5 | 1.0 | 73.5 | 70 |
| | 6 | 113400 | 28.6 | 1.0 | 70.4 | 38 |
| | 7 | 63000 | 25.5 | 1.0 | 73.5 | 70 |
| | 8 | 113400 | 27.5 | 1.0 | 71.5 | 38 |
| | 9 | 63000 | 25.5 | 1.0 | 73.5 | 70 |
| | 10 | 113400 | 27.8 | 1.0 | 71.2 | 38 |
| | 11 | 113400 | 27.6 | 1.0 | 71.4 | 39 |

TABLE 2-4

Preparing parameters of second polymer film composition of Comparative Examples 1 to 11

| Parameter Unit | | Preheating temperature ° C. | Second dry-stirring temperature ° C. | Second dry-stirring time minute | Second compounding temperature ° C. | Second compounding time minute |
|---|---|---|---|---|---|---|
| Comparative Example | 1 | 35 | 35 | 3 | 190 | 8 |
| | 2 | 30 | 30 | 3 | 180 | 12 |
| | 3 | 35 | 35 | 3 | 190 | 8 |

TABLE 2-4-continued

Preparing parameters of second polymer film composition of Comparative Examples 1 to 11

| Parameter Unit | Preheating temperature ° C. | Second dry-stirring temperature ° C. | Second dry-stirring time minute | Second compounding temperature ° C. | Second compounding time minute |
|---|---|---|---|---|---|
| 4 | 30 | 30 | 3 | 180 | 12 |
| 5 | 50 | 50 | 1 | 220 | 6 |
| 6 | 25 | 25 | 1 | 140 | 6 |
| 7 | 50 | 50 | 1 | 220 | 6 |
| 8 | 25 | 25 | 1 | 140 | 6 |
| 9 | 50 | 50 | 1 | 220 | 6 |
| 10 | 25 | 25 | 1 | 140 | 6 |
| 11 | 35 | 35 | 3 | 190 | 8 |

TABLE 2-5

Constitution of polymer film of Comparative Examples 1 to 11

| | Constitution of polymer film | Number of layers of first portion (Layer I) | Number of layers of second portion (Layer II) |
|---|---|---|---|
| Comparative Example 1 | Layer II/Layer I/Layer II | 1 | 2 |
| Comparative Example 2 | Layer II/Layer I/Layer II | 1 | 2 |
| Comparative Example 3 | Layer II/Layer I/Layer II/Layer I/Layer II | 2 | 3 |
| Comparative Example 4 | Layer II/Layer I/Layer II | 1 | 2 |
| Comparative Example 5 | Layer II/Layer I/Layer II | 1 | 2 |
| Comparative Example 6 | Layer II/Layer I/Layer II | 1 | 2 |
| Comparative Example 7 | Layer II/Layer I/Layer II | 1 | 2 |
| Comparative Example 8 | Layer II/Layer I/Layer II | 1 | 2 |
| Comparative Example 9 | Layer II/Layer I/Layer II | 1 | 2 |
| Comparative Example 10 | Layer II/Layer I/Layer II/Layer I/Layer II | 2 | 3 |
| Comparative Example 11 | Layer II/Layer I/Layer II/Layer I/Layer II | 2 | 3 |

TABLE 2-6

Properties of polymer film of Comparative Examples 1 to 11

| Unit | | Melt index of Layer I g/10 min | Total thickness of Layer I mm | Total thickness ratio of Layer I | Sum of product of melt index of Layer I and thickness ratio of Layer I g/10 min |
|---|---|---|---|---|---|
| Comparative Example | 1 | 0.6 | 0.176 | 0.22 | 0.13 |
| | 2 | 10.6 | 0.200 | 0.25 | 2.65 |
| | 3 | 8.2 | 0.320 | 0.40 | 3.28 |
| | 4 | 3.5 | 0.080 | 0.10 | 0.35 |
| | 5 | 6.2 | 0.136 | 0.17 | 1.05 |
| | 6 | 7.4 | 0.136 | 0.17 | 1.26 |
| | 7 | 11.4 | 0.232 | 0.29 | 3.31 |
| | 8 | 0.6 | 0.160 | 0.20 | 0.12 |
| | 9 | 3.5 | 0.080 | 0.10 | 0.35 |
| | 10 | 12.1 | 0.232 | 0.29 | 3.51 |
| | 11 | 0.6 | 0.264 | 0.33 | 0.20 |

TABLE 2-7

Properties of polymer film of Comparative Examples 1 to 11

| Unit | | Melt index of Layer II g/10 min | Total thickness of Layer II mm | Total thickness ratio of Layer II | Sum of product of melt index of Layer II and thickness ratio of Layer II g/10 min |
|---|---|---|---|---|---|
| Comparative Example | 1 | 2.1 | 0.624 | 0.78 | 1.64 |
| | 2 | 1.9 | 0.600 | 0.75 | 1.43 |
| | 3 | 2.1 | 0.480 | 0.60 | 1.26 |
| | 4 | 1.9 | 0.720 | 0.90 | 1.71 |
| | 5 | 10.6 | 0.664 | 0.83 | 8.80 |
| | 6 | 1.2 | 0.664 | 0.83 | 1.00 |
| | 7 | 10.6 | 0.568 | 0.71 | 7.53 |
| | 8 | 1.2 | 0.640 | 0.80 | 0.96 |
| | 9 | 10.6 | 0.720 | 0.90 | 9.54 |
| | 10 | 1.2 | 0.568 | 0.71 | 0.85 |
| | 11 | 2.1 | 0.536 | 0.67 | 1.41 |

3.3. Manufacture and Property Evaluation of Laminated Glass

Laminated glasses were manufactured using the polymer films of Examples 1 to 11 and Comparative Examples 1 to 11, respectively. First, the polymer film was cut into 300 mm×300 mm. Then, two clean and transparent float glass sheets (length: 300 mm; width: 300 mm; thickness: 2 mm) were provided for each of the polymer films. The cut polymer films of Examples 1 to 11 and Comparative Examples 1 to 11 were interposed respectively between two transparent float glass sheets to obtain a laminated object. The laminated object was pre-pressed by means of vacuuming using nip rollers. The pre-pressing using nip rollers was performed as follows. The conveying rate of conveyor belt of roller press was set to 4.5 m/min, the temperature of oven was set to 180° C., and the pressure of rollers was set to 3 kg/cm². The laminated object was placed on the conveyor belt and passed through the oven and the rollers in sequence, wherein the distance between the rollers was set to 5 mm. Then, the pre-pressed laminated object was placed in an autoclave, subjected to a hot-pressing with a pressure of 13 bar and a temperature of 135° C. for 120 minutes, and then cooled to room temperature to obtain the laminated glass.

The polymer films and laminated glasses of Examples 1 to 11 and Comparative Examples 1 to 11 were subjected to evaluation of continuous layer structure, evaluation of loss factor, falling ball test, snowflake defect test, and measurement of light transmittance according to the aforementioned testing methods. The results are listed in Tables 3-1 and Table 3-2.

TABLE 3-1

Properties of polymer films and laminated glasses of Examples 1 to 11

|  | | Continuous layer structure | Loss factor | Falling ball test | Snowflake defect | Light transmittance |
|---|---|---|---|---|---|---|
| Example | 1 | ○ | 0.279 | ○ | ○ | 87.9% |
|  | 2 | ○ | 0.264 | ○ | ○ | 88.7% |
|  | 3 | ○ | 0.311 | ○ | ○ | 88.3% |
|  | 4 | ○ | 0.327 | ○ | ○ | 88.2% |
|  | 5 | ○ | 0.342 | ○ | ○ | 87.6% |
|  | 6 | ○ | 0.258 | ○ | ○ | 90.2% |
|  | 7 | ○ | 0.261 | ○ | ○ | 88.7% |
|  | 8 | ○ | 0.296 | ○ | ○ | 89.8% |
|  | 9 | ○ | 0.287 | ○ | ○ | 88.2% |
|  | 10 | ○ | 0.294 | ○ | ○ | 88.6% |
|  | 11 | ○ | 0.338 | ○ | ○ | 87.9% |

TABLE 3-2

Properties of polymer films and laminated glasses of Comparative Examples 1 to 11

|  | | Continuous layer structure | Loss factor | Falling ball test | Snowflake defect | Light transmittance |
|---|---|---|---|---|---|---|
| Comparative Example | 1 | x | 0.182 | ○ | ○ | 87.6% |
|  | 2 | ○ | 0.362 | x | x | 84.3% |
|  | 3 | ○ | 0.384 | x | ○ | 86.7% |
|  | 4 | ○ | 0.213 | ○ | ○ | 90.1% |
|  | 5 | ○ | 0.373 | x | x | 82.3% |
|  | 6 | ○ | 0.308 | ○ | x | 87.6% |
|  | 7 | ○ | 0.398 | x | x | 80.2% |
|  | 8 | x | 0.126 | ○ | ○ | 87.7% |
|  | 9 | x | 0.377 | x | x | 83.6% |
|  | 10 | ○ | 0.373 | x | x | 84.9% |
|  | 11 | x | 0.192 | ○ | ○ | 86.2% |

As shown in Table 3-1, Examples 1 to 11 show that, the polymer films of the present invention have a continuous layer structure and good structural uniformity. The laminated glasses manufactured from the polymer films of the present invention all have a loss factor larger than 0.25, that is, a good acoustic insulation effect. In addition, the laminated glasses manufactured from the polymer films of the present invention can pass the falling ball test and snowflake defect test, and have a qualified light transmittance (i.e., 87.5% or more).

By contrast, as shown in Table 3-2, the laminated glass manufactured from the polymer film that is not according to the present invention cannot simultaneously have an excellent acoustic insulation effect, excellent optical properties and an excellent safety property. In particular, Comparative Examples 1 and 11 show that, when the melt index of each layer of the first portion and the sum of the product of the melt index and the thickness ratio of each layer of the first portion are lower than the designated ranges, even the melt index of each layer of the second portion and the sum of the product of the melt index and the thickness ratio of each layer of the second portion are within the designated range, the polymer film has poor structural uniformity, and the manufactured laminated glass has a poor acoustic insulation effect (a loss factor of lower than 0.25). Comparative Example 2 shows that, when the melt index of each layer of the first portion and the sum of the product of the melt index and the thickness ratio of each layer of the first portion are higher than the designated ranges, even the melt index of each layer of the second portion and the sum of the product of the melt index and the thickness ratio of each layer of the second portion are within the designated ranges, the manufactured laminated glass cannot be provided with an excellent safety property (it fails in falling ball test) and good optical properties (it fails in snowflake defect test and has a light transmittance lower than 87.5%). Comparative Examples 3 and 4 show that, when the sum of the product of the melt index and the thickness ratio of each layer of the first portion falls outside the designated range, even the melt index of each layer of the second portion and the sum of the product of the melt index and the thickness ratio of each layer of the second portion are within the designated ranges, and the melt index of each layer of the first portion is within the designated range, the manufactured laminated glass has a poor acoustic insulation effect (a loss factor of lower than 0.25) or poor optical properties (a light transmittance of lower than 87.5%). Comparative Example 5 shows that, when the melt index of each layer of the second portion and the sum of the product of the melt index and the thickness ratio of each layer of the second portion are higher than the designated ranges, even the melt index of each layer of the first portion and the sum of the product of the melt index and the thickness ratio of each layer of the first portion are within the designated ranges, the manufactured laminated glass cannot be provided with an excellent safety property (it fails in falling ball test) and good optical properties (it fails in snowflake defect test and has a light transmittance of lower than 87.5%). Comparative Example 6 shows that, when the melt index of each layer of the second portion and the sum of the product of the melt index and the thickness ratio of each layer of the second portion are lower than the designated ranges, even the melt index of each layer of the first portion and the sum of the product of the melt index and the thickness ratio of each layer of the first portion are within the designated ranges, the manufactured laminated glass has poor optical properties (it fails in snowflake defect test). Comparative Example 7 shows that, when the melt index of each layer of the first portion and the second portion and the sum of the product of the melt index and the thickness ratio of each layer of the first portion and the second portion are higher than the designated ranges, the manufactured laminated glass cannot be provided with an excellent safety property (it fails in falling ball test) and good optical properties (it fails in snowflake defect test and has a light transmittance of lower than 87.5%). Comparative Example 8 shows that, when the melt index of each layer of the first portion and the second portion and the sum of the product of the melt index and the thickness ratio of each layer of the first portion and the second portion are lower than the designated ranges, the polymer film has poor structural uniformity, and the manufactured laminated glass has a poor acoustic insulation effect (a loss factor of lower than 0.25). Comparative Example 9 shows that, when the sum of the product of the melt index and the thickness ratio of each layer of the first portion, the melt index of each layer of the second portion, and the sum of the product of the melt index and the thickness ratio of each layer of the second portion fall outside the designated ranges, the manufactured laminated glass cannot be provided with an excellent safety property (it fails in falling ball test) and good optical properties (it fails in snowflake defect test and has a light transmittance of lower than 87.5%). Comparative Example 10 shows that, when the melt index of each layer of the first portion and the sum of the product of the melt index and the thickness ratio of each layer of the first portion are higher than the designated ranges, and the melt index of each layer of the second portion and the sum of the product of the melt index and the thickness ratio of each layer of the second portion are lower than the designated ranges, the manufactured laminated glass cannot be provided with excellent safety property (it fails in falling ball test) and good optical properties (it fails in snowflake defect test and has a light transmittance of lower than 87.5%).

The above examples are used to illustrate the principle and efficacy of the present invention and show the inventive features thereof, but are not used to limit the scope of the present invention. People skilled in this field may proceed with a variety of modifications and replacements based on the disclosures and suggestions of the invention as described. Therefore, the scope of protection of the present invention is that as defined in the claims as appended.

What is claimed is:

1. A polymer film, which comprises a first portion and a second portion laminated with the first portion, the first portion and the second portion independently consist of one or more layers, wherein:
    each layer of the first portion independently has a melt index ranging from 3.5 g/10 min to 10.0 g/10 min, and each layer of the second portion independently has a melt index lower than 3.5 g/10 min;
    each layer of the first portion independently has a thickness ratio of its thickness to the total thickness of the first portion and the second portion and a product of its melt index and the thickness ratio, with the proviso that the sum of the product of each layer of the first portion ranges from 0.39 g/10 min to 2.50 g/10 min; and
    each layer of the second portion independently has a thickness ratio of its thickness to the total thickness of the first portion and the second portion and a product of its melt index and the thickness ratio, with the proviso that the sum of the product of each layer of the second portion ranges from 1.10 g/10 min to 2.95 g/10 min,
    wherein each layer of the first portion and each layer of the second portion independently comprise polyvinyl acetal,
    wherein the melt index of each layer of the first portion and the melt index of each layer of the second portion are measured in accordance with ASTM D1238 under 190° C. and a loading of 2.16 kg.

2. The polymer film of claim 1, wherein the melt index of each layer of the second portion is independently from 1.5 g/10 min to 3.3 g/10 min.

3. The polymer film of claim 1, wherein each layer of the first portion and each layer of the second portion independently comprise poly(vinyl butyral).

4. The polymer film of claim 2, wherein each layer of the first portion and each layer of the second portion independently comprise poly(vinyl butyral).

5. The polymer film of claim 1, wherein each layer of the first portion independently comprises polyvinyl acetal with the following properties: a degree of acetalization ranging from 56 mol % to 74 mol %, a degree of acetylation ranging from 5 mol % to 15 mol %, and a content of hydroxyl ranging from 20 mol % to 30 mol %.

6. The polymer film of claim 1, wherein each layer of the second portion independently comprises polyvinyl acetal with the following properties: a degree of acetalization ranging from 60 mol % to 75 mol %, a degree of acetylation ranging from 0.1 mol % to 5 mol %, and a content of hydroxyl ranging from 20 mol % to 35 mol %.

7. The polymer film of claim 1, wherein the polyvinyl acetal comprised in each layer of the first portion independently has a number average molecular weight (Mn) ranging from 100,000 to 240,000.

8. The polymer film of claim 1, wherein the polyvinyl acetal comprised in each layer of the second portion independently has a number average molecular weight (Mn) ranging from 90,000 to 120,000.

9. The polymer film of claim 1, wherein each layer of the first portion and each layer of the second portion independently further comprise a plasticizer.

10. The polymer film of claim 2, wherein each layer of the first portion and each layer of the second portion independently further comprise a plasticizer.

11. The polymer film of claim 9, wherein each layer of the first portion independently comprises a plasticizer in an amount ranging from 55 parts by weight to 85 parts by weight based on 100 parts by weight of the polyvinyl acetal comprised therein, and each layer of the second portion independently comprises a plasticizer in an amount ranging from 30 parts by weight to 50 parts by weight based on 100 parts by weight of the polyvinyl acetal comprised therein.

12. The polymer film of claim 10, wherein each layer of the first portion independently comprises a plasticizer in an amount ranging from 55 parts by weight to 85 parts by weight based on 100 parts by weight of the polyvinyl acetal comprised therein, and each layer of the second portion independently comprises a plasticizer in an amount ranging from 30 parts by weight to 50 parts by weight based on 100 parts by weight of the polyvinyl acetal comprised therein.

13. The polymer film of claim 1, wherein the one or more layers of the first portion constitute first sub-portion(s), the one or more layers of the second portion constitute second sub-portion(s), and the first sub-portion(s) and the second sub-portion(s) are arranged alternatively, wherein the number of the first sub-portion(s) is M and the number of the second sub-portion(s) is N, M and N are independently positive integers.

14. The polymer film of claim 2, wherein the one or more layers of the first portion constitute first sub-portion(s), the one or more layers of the second portion constitute second sub-portion(s), and the first sub-portion(s) and the second sub-portion(s) are arranged alternatively, wherein the number of the first sub-portion(s) is M and the number of the second sub-portion(s) is N, M and N are independently positive integers.

15. The polymer film of claim 13, wherein N is M+1.

16. The polymer film of claim 14, wherein N is M+1.

17. A laminated glass, which comprises a first glass sheet, an intermediate film, and a second glass sheet in sequence, wherein the intermediate film is provided by the polymer film of claim 1.

* * * * *